United States Patent [19]

Tracy et al.

[11] Patent Number: 4,576,825
[45] Date of Patent: Mar. 18, 1986

[54] METHOD AND COMPOSITION FOR CURING MEAT

[75] Inventors: Catherine O. Tracy, Scottsdale; Evan F. Binkerd, Phoenix; Robert B. Rendek; Raymond J. Wrobel, both of Scottsdale, all of Ariz.

[73] Assignee: Conagra, Inc., Omaha, Nebr.

[21] Appl. No.: 32,191

[22] Filed: Apr. 23, 1979

[51] Int. Cl.$^4$ .................. A23B 4/12; A23L 3/34
[52] U.S. Cl. .................. 426/266; 426/332; 426/532; 426/652
[58] Field of Search ............ 426/266, 264, 265, 281, 426/332, 96, 99, 652, 532

[56] References Cited

U.S. PATENT DOCUMENTS

| | | | |
|---|---|---|---|
| 2,828,212 | 3/1958 | Sair | 426/266 |
| 2,910,369 | 10/1959 | Klein | 426/266 |
| 2,955,042 | 10/1960 | Firor et al. | 426/266 |
| 3,099,566 | 7/1963 | Flesch et al. | 426/266 |
| 3,240,612 | 3/1966 | Wolnak | 426/652 |
| 3,359,120 | 12/1967 | Meusel et al. | 426/265 |
| 3,423,489 | 1/1969 | Arens et al. | 264/4 |
| 3,516,941 | 6/1970 | Matson | 252/316 |
| 3,560,222 | 2/1971 | Delaney | 426/266 |
| 3,692,534 | 9/1972 | Ueno et al. | 426/331 |
| 3,716,381 | 2/1973 | Ueno et al. | 426/332 |
| 3,821,424 | 6/1974 | Gould | 426/532 |
| 3,901,981 | 8/1975 | Draudt | 426/266 |
| 3,966,974 | 6/1976 | Bharucha et al. | 426/266 |
| 4,039,690 | 8/1977 | Bharucha et al. | 426/266 |
| 4,068,006 | 1/1978 | Moritz | 426/99 |
| 4,076,849 | 2/1978 | Bharucha et al. | 426/266 |
| 4,079,153 | 3/1978 | Coleman | 426/265 |

FOREIGN PATENT DOCUMENTS 48-24264 7/1973 Japan ..................... 426/264

OTHER PUBLICATIONS

Bakan, Microencapsulation of Foods and Related Products, *Food Technology*, 34–44, Nov. 1973.
Fiddler et al., Inhibition of Formation of Volatile Nitrosamines in Fried Bacon by the Use of Cure-Solubilized α-Tocopherol, *J. Agric. Food Chem.*, vol. 26, No. 3, pp. 653–656 (1978).
Details on Use of Lactobacilli Released, *The National Provisioner*, p. 17, Feb. 24, 1979.
Massey, New Formulation Helps Reduce Nitrite Needs, *The National Provisioner*, pp. 28–37, Mar. 17, 1979.
Mottram, *J. Sci. Fd. Agric.*, vol. 16, pp. 47–53 (1975).
Fan et al., Journal of Food Science, vol. 38, pp. 1067–1069 (1973).

Primary Examiner—George Yeung
Attorney, Agent, or Firm—Willian Brinks Olds Hofer Gilson & Lione Ltd.

[57] ABSTRACT

The formation of nitrosamines in cooked, cured meat products such as ham and bacon is reduced by a process in which the meat is injected with a curing solution containing nitrite and a food grade acid encapsulated with a coating material which melts at a temperature above 115° F.

21 Claims, No Drawings

METHOD AND COMPOSITION FOR CURING MEAT

BACKGROUND OF THE INVENTION

Cured meat products such as ham and bacon are conventionally prepared by treatment of fresh meat with a curing solution containing alkali metal nitrite, sodium chloride, sugar, and spices, as well as additional materials for accelerating or modifying the cure.

The nitrite has a unique and distinctive function in that it provides bacon and ham with their characteristic cured color while at the same time protecting the product against dangerous food-spoiling microorganisms such as *Clostridium botulinum*.

Unfortunately, minute amounts of undesirable nitrosamines may occur in meats, particularly bacon, which have been cured with nitrite-containing curing solutions and which have been cooked by methods in which the fats reach relatively high temperatures. For example, N-Nitrosopyrrolidine and dimethylnitrosamine are found on frying bacon, the cook-out fat containing the highest proportion of these nitrosamines, with N-Nitrosopyrrolidine being present in the greater amount. These nitrosamines are not found in the cured and processed meat. Apparently, the temperature attained by the fats in frying or equivalent cooking processes facilitates the reaction of alkali metal nitrites and amines of the meat to form nitrosamines. Since N-Nitrosopyrrolidine and dimethylnitrosamine have been found to be carcinogenic in tests on experimental animals, they are regarded as a potential hazard in human food products. It is desirable therefore to find a means for reducing or preventing the formation of these substances in cooked meat products while at the same time retaining the use of nitrite for its essential color formation and anti-botulism function.

SUMMARY OF THE INVENTION

The present invention provides a process for preparing cured meat so as to reduce the quantity of nitrosamines formed when the cured meat is subjected to frying temperatures. The process comprises the steps of injecting the meat with a curing solution containing nitrite and a food grade acid encapsulated with a non-toxic coating material which melts at a temperature above 115° F., holding the meat at a temperature below the melting point of said coating material for a period of time to permit the nitrite to exert its color-developing and anti-botulism effect on the meat, and thereafter processing the meat at a temperature sufficient to melt said coating material to thereby release the acid into said meat.

We have found that the acid, upon release into the meat, apparently reacts with and removes substantial quantities of nitrite from the meat and, although the formation of nitrosamines is generally believed to be favored under more acid conditions, we have found that this factor is overcome sufficiently by making less nitrite available for reaction with amines contained in the meat so that the net overall effect of the process is to substantially reduce the quantity of nitrosamines formed when the meat is fried.

The food grade acids used in the present invention are capable of reacting with and thus depleting nitrites, and therefore it would not be feasible to add these acids to the curing brine or pickle prior to injection into the meat, since this would cause nitrite depletion prior to the time the nitrite had an opportunity to exert its desired function. In the present invention, the acid is encapsulated with a coating material which melts at a higher temperature, so that the acid is not available at the ambient temperatures of the injection and curing stages, and thus the nitrite is present in full strength to carry out its color fixation and anti-botulism function. However, the coating material melts at the temperatures encountered in the subsequent processing of the meat in the smokehouse, whereby the coating becomes discontinuous and the acid is freed to reduce or deplete the nitrite.

Cured meat products made by the present invention exhibit, upon frying, a substantially reduced level of nitrosamine, as compared to controls. We have found in sensory evaluation that the treatment has no adverse effect on the flavor or other eating characteristics of the product.

DETAILED DESCRIPTION

For illustrative purposes, the following detailed description will be made in connection with the preparation of bacon from pork bellies, although it will be understood that the invention applies equally to other meat products which must be injected with a curing solution containing nitrite and processed and then subsequently cooked to frying temperatures prior to eating.

The acids to be encapsulated and used in the present invention are any food grade acids capable of reacting with nitrite. They are normally in solid or crystalline form and soluble in water. Specific examples include citric acid, lactic acid, sorbic acid, tartaric acid, ascorbic acid, isoascorbic acid and adipic acid, and compatible mixtures thereof.

The non-toxic coating material usable for encapsulating the food grade acid should be insoluble in or immiscible with the food grade acid under the encapsulating conditions. The coating material should melt at temperatures above 115° F., preferably at the temperatures encountered during smokehouse processing. In normal processing, the temperature of the smokehouse itself is maintained in the range of 128° to 142° F., and the internal temperature of the bacon bellies is brought within the range 128°–130° F., although internal temperatures of as high as 142° F. may be encountered. Thus, the coating material should usually melt within the range 115°–142° F., with the preferred range being 120°–138° F.

Substances suitable for use as the coating material include petroleum wax, tallow, hydrogenated lard, hydrogenated vegetable oils, vegetable waxes and other natural waxes. It will be apparent that other materials possessing the desired combination of properties described above will suggest themselves to persons skilled in the art. Petroleum wax is the coating of choice, this substance being a mixture of solid hydrocarbons, paraffinic in nature, derived from petroleum, and refined to meet edible specifications. If desired, the petroleum wax may be used with reinforcing resins.

The encapsulating material may be applied as a coating to the food grade acid in accordance with any one or more known practices such as mixing, panning, spray drying, and the like, as well as by more sophisticated procedures such as the use of concentric biliquid columns. In applying the coating to the acid, a sufficient quantity should be used to attain substantially complete envelopment or coverage of the acid particles or crystals and yet remain within the dimensional characteristics and coating-to-acid ratios desired in the final solid capsule.

One suitable encapsulating procedure, particularly useful in connection with petroleum wax as the encapsulating material, is described in U.S. Pat. No. 3,423,489 wherein a biliquid column is maintained in trajectory for a period of time long enough for the column to constrict along its length into spheroids. The biliquid column consists of a tube of hardenable shell-forming material, such as melted petroleum wax, full of a liquid fill material, such as an aqueous solution of an acid. Another encapsulating method suitable for use in the invention involves melting a hardened oil, adding and dispersing thoroughly therein a finely powdered food grade acid, such as sorbic acid, and thereafter spraying the melted mixture in a low temperature chamber, thereby obtaining the fine powder particles of sorbic acid as granules coated with the hardened oil.

The proportions of coating-to-acid in the capsules usable herein can be varied. Generally speaking, it is advantageous to utilize capsules wherein the fill material (i.e., the acid) constitutes from about 15 to 60% of the weight of the capsule. Smaller proportions of the acid can of course be used, but this tends to introduce more of the coating material than is necessary in the process. The upper limit of the acid content may fluctuate, with smaller size capsules requiring a larger proportion of coating material and consequently a small proportion of fill acid.

The other characteristics of the capsules, such as their dimensions and densities, are likewise variable. Since the encapsulated acid must be dispersed in the curing brine solution and then injected into the meat through injecto-needles, the size of the openings in the needles is a limiting factor on the dimension of the capsules. Generally, the capsules should be less than 1,000 microns in diameter. The preferred dimension is within the range of 100 to 700 microns. It is also desired that the density of the capsules be compatible with the density of the curing solution, so that the capsules can be readily dispersed and will not tend to float or settle out. Known approved food additives may be added to the capsules to modify their densities. The configuration of the capsules is not critical, although of course passage through the holes in the injecto-needles is enhanced as the configuration approaches true sphericity.

In the practice of the present invention, the encapsulated food grade acid is incorporated in the curing solution which is to be injected into the ham, bacon, or other meat to be cured. The curing solution normally contains sodium chloride in an amount on the order of 12 to 20% and sodium nitrite in an amount on the order of 0.10 to 0.18%. Other ingredients such as sugar, spices, phosphates, sodium erythorbate and the like may be included. The quantity of acid-containing capsules added to the curing solution should be sufficient to provide a concentration of the acid in the meat of about 300 to 2000 parts per million. A preferred range is from 800 to 1200 parts per million.

The curing solution containing the nitrite, encapsulated acid and other ingredients is injected into the meat, and from this point on the process may be carried out in substantially the same manner as in conventional processing of the meat. Thus, for example, in the case of bacon, the injected bellies may be combed, drained, processed in the smokehouse, skinned, chilled, tempered, sliced and packaged, all as described in detail in U.S. Pat. No. 3,595,679.

Since the practice of the present invention is dependent on the coating of the encapsulated food grade acid melting during the smokehouse processing, it is of course important that the melting point of the coating material be correlated with the particular smokehouse temperatures chosen for the process. As previously indicated, when the proper correlation is used, the coating material melts and becomes discontinuous and the acid is released. Since the curing pickle containing nitrite and encapsulated acid has been pumped into the meat and permeates all interior areas of the meat, the melting of the coating material releases the acid at all interior points and makes it available to react with and remove nitrites found at these points. Prior to this time, the nitrite has been available in the meat for a sufficient length of time (during pumping, draining, and initial smokehouse processing) to have exerted its beneficial color-fixing and anti-botulism effect.

The bacon produced by the present invention therefore possesses the characteristic color and flavor of conventional bacon, and has been rendered safe against food spoiling microorganisms such as *Clostridium botulinum,* and it also contains substantially reduced levels of nitrosamines upon frying or cooking at high temperatures.

The following examples are illustrative of the practice of the invention. It will be understood, however, that various modifications thereof can readily be evolved in view of the guiding principles and teachings provided herein.

EXAMPLE I

A. Preparation of a control curing composition. A control curing pickle with the following composition was formulated:

| | |
|---|---|
| Water | 81.76% |
| Salt | 15.00% |
| Sodium tripolyphosphate | 2.50% |
| Sodium erythorbate | 0.60% (as monohydrate) |
| Sodium nitrite | 0.12% |
| Flavoring | 0.02% |

The pH of this control composition was 7.55.

B. Preparation of curing composition containing encapsulated citric acid. Using the procedure described in U.S. Pat. No. 3,423,489, an encapsulated citric acid was prepared having the following composition and physical properties:

| | |
|---|---|
| Fill solution | 59% Citric acid |
| | 41% Water |
| Shell material | 60% Paraffin wax |
| | 40% Microcrystalline Wax |
| | (Shellwax 500) |
| Capsule size | 1000 microns |
| Coating weight | 28.5% Shell |
| | (43.1% active) |
| Melting point | 134°-138° F. |

The encapsulated citric acid was used to prepare the following curing composition, which was as closely as possible like the control pickle of part A above, except that it contained encapsulated citric acid and the water content was adjusted to compensate for the added acid:

| | |
|---|---|
| Water | 79.41% |
| Salt | 15.00% |
| Sodium tripolyphosphate | 2.50% |
| Encapsulated citric acid | 2.35% |
| Sodium erythorbate | 0.60% (as monohydrate) |
| Sodium nitrite | 0.12% |
| Flavoring | 0.02% |

The pH of this curing composition containing encapsulated citric acid was 7.45. Since this is substantially the pH of the control pickle, the indication is that the encapsulating material was effectively keeping the citric acid unavailable at this stage of the process.

C. Preparation of curing composition containing encapsulated lactic acid. Using the procedure described in U.S. Pat. No. 3,423,489, an encapsulated lactic acid was prepared having the following composition and physical properties:

| | |
|---|---|
| Fill solution | 86% Lactic acid |
| | 14% Water |
| Shell material | 60% Paraffin wax |
| | 40% Microcrystalline Wax |
| | (Shellwax 500) |
| Capsule size | 1000 microns |
| Coating weight | 31.9% Shell |
| | (58.6% active) |
| Melting point | 134°-138° F. |

The encapsulated lactic acid was used to prepare the following curing composition, which was as closely as possible like the control pickle of part A above, except that it contained encapsulated lactic acid and the water content was adjusted to compensate for the added acid:

| | |
|---|---|
| Water | 80.05% |
| Salt | 15.00% |
| Sodium tripolyphosphate | 2.50% |
| Encapsulated lactic acid | 1.71% |
| Sodium erythorbate | 0.60% (as monohydrate) |
| Sodium nitrite | 0.12% |
| Flavoring | 0.02% |

The pH of this curing composition containing encapsulated lactic acid was 7.40. Since this is substantially the pH of the control pickle, the indication is that the encapsulating material was effectively keeping the lactic acid unavailable at this stage of the process.

D. Preparation of curing composition containing encapsulated sorbic acid. Comminuted sorbic acid powder was thoroughly dispersed in a melt obtained by heating and melting beef tallow (M.P. 130° F.). A homogenizer was used to create the dispersion and the temperature was maintained at about 160° F. during this time. The melted mixture was cooled by being sprayed into a chamber maintained at 75°-90° F., using a rotary dish type sprayer. As a result, a tallow-coated sorbic acid was prepared having the following composition and physical properties:

| | |
|---|---|
| Fill material (sorbic acid) | 37% |
| Shell material (tallow) | 63% |
| Capsule size | 300 microns |
| Melting point | 130° F. |

The encapsulated sorbic acid was used to prepare the following curing composition, which was as closely as possible like the control pickle of part A above, except that it contained encapsulated sorbic acid and the water content was adjusted to compensate for the added acid:

| | |
|---|---|
| Water | 79.09% |
| Salt | 15.00% |
| Sodium tripolyphosphate | 2.50% |
| Encapsulated sorbic acid | 2.67% |
| Sodium erythorbate | 0.60% (as monohydrate) |
| Sodium nitrite | 0.12% |
| Flavoring | 0.02% |

The pH of this curing composition containing tallow coated sorbic acid was 6.55. Since this is lower than the pH of the control pickle (7.55), the indication is that the tallow was not a completely effective encapsulating material under the encapsulating conditions employed, since some of the sorbic acid must have been released to exert its pH-reducing effect. However, uncoated sorbic acid was found to reduce the pH of the same curing pickle to 5.45, thus indicating that the tallow coating on the encapsulated acid prepared above was at least partially effective.

EXAMPLE II

Six fresh skin-on paired bellies (12 total bellies) having green weights averaging 12 to 14 pounds were prepared for test. One belly from each pair was pumped with the control pickle of Example IA, and the corresponding matched belly was pumped with one of the encapsulated acids of Example IB, IC and ID. Targeted curing gains were set at 10% of fresh belly weight, so that the level of nitrite in each belly would be 120 parts per million and the level of acid 1,000 parts per million. Injection of pickle was accomplished by hand stitch pumping the bellies, using a 3"×6" manifold containing 23 needles, on 1" centers, having an orifice opening at the top of the needle of 0.144 inches.

After pumping, the bellies were combed, hung on smokehouse trees and held on drain for 1½ hours before smokehouse processing. Starting smokehouse temperature was 145° F. Liquid smoke was applied 1½ hours after initiating the heating cycle. Smokehouse temperature was maintained at 145° F. over a period of 5 hours until internal temperature of the bellies was 130°-132° F. Smokehouse temperature was then lowered to 140° F. and held at this temperature for an additional 3 hours, until internal temperature of the bellies reached a minimum of 136° F. Internal temperature ranged from 136° F. to 142° F.

After heat processing, the bellies were removed from the smokehouse, weighed, allowed to hang at ambient temperature (75° F.) for approximately 10 hours before skinning and then placed in the cooler (34°-36° F.) for chilling purposes. After chilling (3 days at 34°-36° F.), the bellies were molded and then allowed to temper at 24°-26° F. for an additional 24 hours before slicing. The bellies were sliced flank first and the slices put up in drafts consisting of approximately 1 pound of bacon, totaling 17 to 18 slices per draft. Each draft was vacuum packaged and held at refrigerated storage temperatures of 34°-36° F. until analyzed.

Slices from similar drafts from identical sections of the paired bellies, per specific treatment, were fried and analyzed 21 days after slicing. Alternate slices from each draft were selected for chemical analysis while the remaining slices were used for frying and analysis. The bacon strips were fried 3 minutes on each side in a preheated fry pan at 340° F.±10° F. After blotting the fried bacon slices with paper toweling (to remove excess fat), the fried strips were vacuum packaged and stored in the freezer (−10° F.) until submitted for nitrosamine analysis. Nitrosamines were determined by Thermal Energy Analyzer (T.E.A.) methodology, following the procedure set forth in Fine et al., *Anal. Chem.* 47,1183 (1975).

Sensory evaluation using 3 panels of 48 judges each, was conducted on the control and treated bacon 30 days after processing. No significant difference in degree of likeness was found between the control bacon and the encapsulated citric, lactic and coated sorbic acid treated bacon.

The other processing and analytical data, including nitrosamine results, are set forth in Table 1 below:

TABLE I

| Item | Code No. | Injected With Composition of: | Green Wt. | % Pump | % Curing Gain | % Yield after Processing | Analysis Upon Frying 21 Days After Slicing | | |
|---|---|---|---|---|---|---|---|---|---|
| | | | | | | | NO$_2$ppm | NPyr*(ppb) | DMNA**(ppb) |
| 1. | 368L - Control | Ex. IA | 14.85 | 111.1 | 109.4 | 99.7 | 28 | 14 | 2.2 |
| 2. | 65R - Citric Acid | Ex. IB | 13.13 | 114.2 | 113.5 | 102.8 | 2.8 | 7.1 | 1.3 |
| 3. | 334L - Control | Ex. IA | 14.10 | 109.9 | 107.8 | 98.6 | 26 | 11 | 2.3 |
| 4. | 401R - Citric Acid | Ex. IB | 12.90 | 110.0 | 106.9 | 98.4 | 4.1 | 5.5 | 0.8 |
| 5. | 284L - Control | Ex. IA | 11.90 | 109.2 | 107.1 | 95.0 | 42 | 12 | 3.9 |
| 6. | 446R - Lactic Acid | Ex. IC | 10.40 | 112.5 | 110.6 | 96.7 | 34 | 7.9 | 2.5 |
| 7. | 392R - Control | Ex. IA | 13.45 | 113.0 | 110.4 | 98.1 | 44 | 11 | 1.7 |
| 8. | 376L - Lactic Acid | Ex. IC | 14.30 | 113.3 | 109.8 | 98.6 | 7.7 | 7.1 | 1.1 |
| 9. | 335R - Control | Ex. IA | 12.20 | 110.2 | 107.8 | 97.5 | 34 | 8 | 1.4 |
| 10. | 364L - Sorbic Acid | Ex. ID | 13.00 | 110.8 | 107.7 | 97.7 | 9.1 | 5.3 | 0.7 |
| 11. | 151R - Control | Ex. IA | 9.70 | 114.4 | 110.3 | 96.9 | 16 | 6.1 | 1.2 |
| 12. | 458L - Sorbic Acid | Ex. ID | 10.50 | 115.2 | 114.3 | 99.0 | 9.0 | 4.6 | 0.6 |

*N—Nitrosopyrrolidine
**dimethylnitrosamine

Nitrosopyrrolidine levels in the fried bacon indicate that the following average percent reduction in NPyr levels between test and control samples was realized:

| Citric v. control | 50.0% |
|---|---|
| Lactic v. control | 35.0% |
| Sorbic v. control | 30.0% |

The data indicates that the use of encapsulated agents such as citric, lactic and sorbic acid in pickle solutions for pumping bellies significantly reduces nitrosamines in the fried bacon.

We claim:

1. A process for preparing cured ham or bacon so as to reduce the quantity of nitrosamines formed when the cured meat is subjected to frying temperatures, comprising the steps of injecting ham or bacon belly meat with a curing solution containing alkali metal nitrite and a sufficient amount of food grade acid encapsulated with a non-toxic coating material which melts at a temperature above 115° F., said acid being in an amount sufficient to provide a desired concentration in the meat to react with and substantially reduce or deplete the nitrite and being capable, in its encapsulated form, of causing reduction of nitrite concentration in said solution, holding the meat at a temperature below the melting point of said coating material for a period of time to permit the nitrite to exert its color-developing and anti-botulism effect on the meat, and thereafter processing the meat at a temperature sufficient to melt said coating material and thus release the acid into said meat in order for it to react with said injected nitrite, thereby reducing the amount of nitrite available for reaction with amines contained in the meat whereby the nitrosamine formation is reduced upon frying.

2. The process of claim 1 wherein said cured meat is bacon.

3. The process of claim 1 wherein said food grade acid is citric acid.

4. The process of claim 1 wherein said food grade acid is lactic acid.

5. The process of claim 1 wherein said food grade acid is sorbic acid.

6. The process of claim 1 wherein said coating material comprises a petroleum wax.

7. The process of claim 1 wherein said coating material comprises tallow.

8. The process of claim 1 wherein said encapsulated acid is in the form of capsules having diameters less than 1,000 microns.

9. The process of claim 1 wherein said coating material melts within the range of 115°–142° F.

10. The process of claim 1 wherein said coating material melts within the range of 120°–138° F.

11. The process of claim 1 wherein the quantity of encapsulated acid added to the curing solution is sufficient to provide a concentration of acid in the meat of about 300 to 2000 parts per million.

12. The process of claim 11 wherein said concentration is about 800 to 1200 parts per million.

13. A meat curing composition for reducing the quantity of nitrosamines formed in ham or bacon, comprising an injectible meat curing solution containing nitrite and a food grade acid encapsulated with a non-toxic coating material which melts above 115° F., said acid being present in said solution in an amount sufficient to provide a concentration of at least 300 ppm in the meat, and said acid being further characterized as being capable, in its unencapsulated form, of causing reduction of nitrite concentration in said solution.

14. The composition of claim 13 in which the coating material melts in the range of 115°–142° F.

15. The composition of claim 13 in which the coating material melts in the range of 128°–136° F.

16. The composition of claim 13 in which said coating material comprises petroleum wax.

17. The composition of claim 13 in which said coating material is tallow.

18. The composition of claim 13 in which said acid is citric acid.

19. The composition of claim 13 in which said acid is lactic acid.

20. The composition of claim 13 in which said acid is sorbic acid.

21. The composition of claim 13 in which said encapsulated acid is in the form of capsules having diameters less than 1,000 microns.

* * * * *